(12) United States Patent
Burns

(10) Patent No.: US 7,443,509 B1
(45) Date of Patent: Oct. 28, 2008

(54) OPTICAL AND ELECTRONIC INTERFACE FOR OPTICALLY COUPLED RESONATORS

(76) Inventor: David W. Burns, 15770 Rica Vista Way, San Jose, CA (US) 95127-2731

( * ) Notice: Subject to any disclaimer, the term of this patent is extended or adjusted under 35 U.S.C. 154(b) by 362 days.

(21) Appl. No.: 11/164,917

(22) Filed: Dec. 10, 2005

Related U.S. Application Data

(60) Provisional application No. 60/593,119, filed on Dec. 12, 2004, provisional application No. 60/593,116, filed on Dec. 12, 2004, provisional application No. 60/593,117, filed on Dec. 12, 2004, provisional application No. 60/593,118, filed on Dec. 12, 2004.

(51) Int. Cl.
G01B 9/02 (2006.01)

(52) U.S. Cl. ...................................... 356/480

(58) Field of Classification Search ................. 356/480, 356/506, 519
See application file for complete search history.

(56) References Cited

U.S. PATENT DOCUMENTS

| | | | |
|---|---|---|---|
| 4,126,049 A | 11/1978 | Cotter |
| 4,137,511 A | 1/1979 | Jones |
| 4,372,173 A | 2/1983 | EerNise |
| 4,567,451 A | 1/1986 | Greenwood |
| 4,721,925 A | 1/1988 | Farace |
| 4,724,351 A | 2/1988 | EerNisse |
| 4,743,752 A | 5/1988 | Olsen |
| 4,744,863 A | 5/1988 | Guckel |
| 4,772,786 A | 9/1988 | Langdon |
| 4,831,304 A | 5/1989 | Dorey |
| 4,841,775 A | 6/1989 | Ikeda |
| 4,853,669 A | 8/1989 | Guckel |
| 4,884,450 A | 12/1989 | Greenwood |
| 4,897,360 A | 1/1990 | Guckel |
| 4,926,143 A | 5/1990 | Harada |
| 4,966,649 A | 10/1990 | Harada |
| 4,996,082 A | 2/1991 | Guckel |
| 5,009,108 A | 4/1991 | Harada |
| 5,060,526 A | 10/1991 | Barth |
| 5,089,695 A | 2/1992 | Willson |
| 5,090,254 A | 2/1992 | Guckel |
| 5,101,664 A | 4/1992 | Hockaday |
| 5,105,665 A | 4/1992 | Parsons |
| 5,165,289 A | 11/1992 | Tilmans |
| 5,188,983 A | 2/1993 | Guckel |
| 5,275,055 A | 1/1994 | Zook |
| 5,295,395 A | 3/1994 | Hocker |
| 5,338,929 A | 8/1994 | Douma |
| 5,417,115 A | 5/1995 | Burns |
| 5,442,963 A | 8/1995 | Largeau |
| 5,458,000 A | 10/1995 | Burns |
| 5,473,944 A | 12/1995 | Kurtz |
| 5,485,753 A | 1/1996 | Burns |
| 5,511,427 A | 4/1996 | Burns |

(Continued)

Primary Examiner—Hwa S Lee (Andrew)
(74) Attorney, Agent, or Firm—David W. Burns

(57) ABSTRACT

A method for determining a resonant frequency of an optically coupled resonator includes modulating an incident light and striking a laterally offset photodiode with the modulated incident light. An electric field is generated between the laterally offset photodiode and the resonator in response to the modulated incident light, and the resonator is driven with a driving component of the generated electric field. A reflected light from the resonator is sensed, and the resonant frequency of the resonator is determined based on the reflected light. A system for determining a resonant frequency of an optically coupled resonator and a method of sensing an applied stimulus are also disclosed.

23 Claims, 8 Drawing Sheets

U.S. PATENT DOCUMENTS

| | | |
|---|---|---|
| 5,543,349 A | 8/1996 | Kurtz |
| 5,550,516 A | 8/1996 | Burns |
| 5,559,358 A | 9/1996 | Burns |
| 5,654,819 A | 8/1997 | Goossen |
| 5,683,594 A | 11/1997 | Hocker |
| 5,714,690 A | 2/1998 | Burns |
| 5,729,075 A | 3/1998 | Strain |
| 5,747,705 A | 5/1998 | Herb |
| 5,772,322 A | 6/1998 | Burns |
| 5,780,742 A | 7/1998 | Burns |
| 5,808,210 A | 9/1998 | Herb |
| 5,831,262 A | 11/1998 | Greywall |
| 5,844,236 A | 12/1998 | Wilson |
| 5,880,509 A | 3/1999 | Watanabe |
| 5,969,257 A | 10/1999 | De Bortoli |
| 6,006,607 A | 12/1999 | Bryzek |
| 6,031,944 A | 2/2000 | Youngner |
| 6,229,190 B1 | 5/2001 | Bryzek |
| 6,246,638 B1 | 6/2001 | Zook |
| 6,255,728 B1 | 7/2001 | Nasiri |
| 6,346,742 B1 | 2/2002 | Bryzek |
| 6,351,996 B1 | 3/2002 | Nasiri |
| 6,487,913 B2 | 12/2002 | Debesis |
| 6,557,419 B1 | 5/2003 | Herb |
| 6,710,355 B2 | 3/2004 | Youngner |
| 6,714,007 B2 | 3/2004 | Youngner |
| 6,763,723 B1 | 7/2004 | Zook |
| 6,894,787 B2 | 5/2005 | Youngner |
| 6,966,228 B2 | 11/2005 | Binet |
| 2004/0231409 A1 | 11/2004 | Lelong-Feneyrou |
| 2004/0244502 A1 | 12/2004 | Youngner |

FIG. 6
FIG. 6a
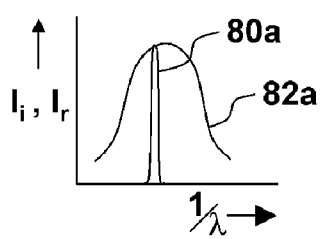
FIG. 6b
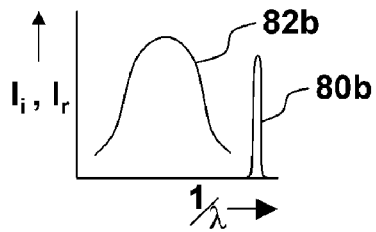
FIG. 6c
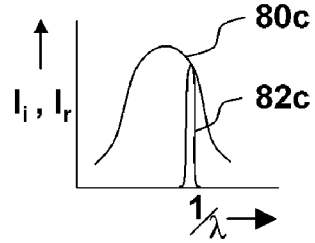
FIG. 6d
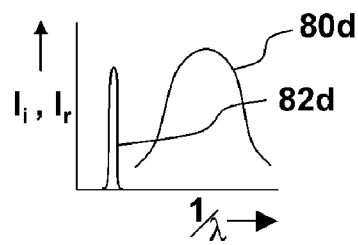
FIG. 6e
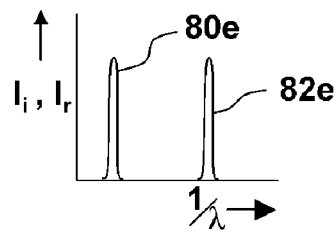
FIG. 6f
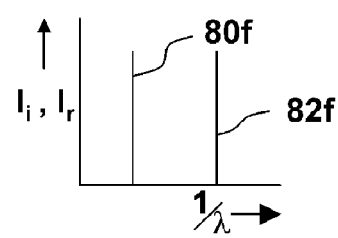
FIG. 6g
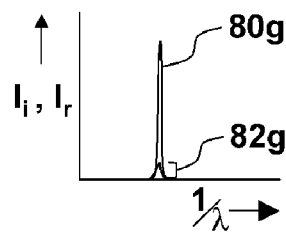
FIG. 6h
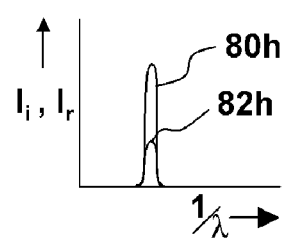
FIG. 6i
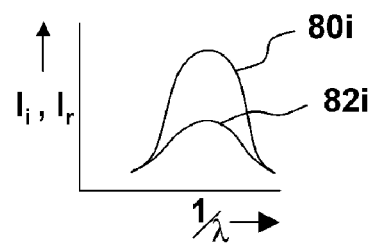
FIG. 6j
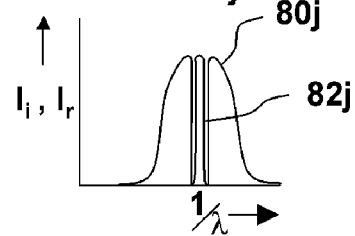

OPTICAL AND ELECTRONIC INTERFACE FOR OPTICALLY COUPLED RESONATORS

CROSS-REFERENCES TO RELATED APPLICATIONS

This application claims the benefit of, and hereby incorporates by reference in its entirety U.S. Provisional Application No. 60/593,119 filed Dec. 12, 2004, and also incorporates by reference in its entirety co-pending U.S. Utility application Ser. No. 10/905,036 filed Dec. 12, 2004, U.S. Provisional Application No. 60/593,116 filed Dec. 12, 2004, U.S. Provisional Application No. 60/593,117 filed Dec. 12, 2004, and U.S. Provisional Application No. 60/593,118 filed Dec. 12, 2004.

FIELD OF THE INVENTION

This invention relates generally to semiconductor devices, and more specifically to optically coupled resonators for sensors, filters and oscillators.

BACKGROUND OF THE INVENTION

Resonant sensors are used in the precision pressure measurement field because of their high stability, high sensitivity and low temperature coefficients. Resonant sensors can be constructed of primarily silicon-based materials using standard processes of the semiconductor industry including thin-film deposition, etching, doping and lithography. While resonant pressure sensors are generally more complex than piezoresistive pressure sensors, their stability and accuracy are less dependent on electronic signal processing circuitry than are comparable piezoresistive sensors and capacitive sensors. Currently available resonant sensors have resonators comprised of a single material such as quartz, single crystal silicon or deposited polysilicon films. Very high precision resonators have been made from well-cut quartz.

The vibrating micromechanical body or resonator of a resonant pressure sensor provides a frequency as output data, the frequency depending upon a stress such as pressure that modifies the natural resonant vibrational frequency of the resonator. A load applied to the sensor structure strains the resonator causing a resonant frequency shift of the resonator. The frequency output of the resonator provides a measure of the magnitude of the mechanical load applied to the sensor structure, and as a result, pressure can be measured as a consequence of the frequency shift. Currently available resonant pressure sensors interface with analog and/or digital electronics to measure pressure.

In a conventional piezoresistive pressure sensor, deformations of a silicon diaphragm with applied pressure cause shifts in a Wheatstone bridge fabricated from single-crystal piezoresistors in the diaphragm resulting in a voltage output indicating the amount of pressure applied to the sensor. The output voltage from the Wheatstone bridge requires an analog-to-digital (A/D) conversion to be used in digital systems. An example of a surface-micromachined absolute pressure sensor has a pressure diaphragm formed from a deposited thin film of polysilicon with an integral vacuum cavity reference directly under the diaphragm and dielectrically isolated polysilicon piezoresistors, as described in "Sealed cavity semiconductor pressure transducers and method of producing the same," U.S. Pat. No. 4,744,863, Guckel et al., issued May 17, 1988.

The widespread use and continuing trend toward digital information and control systems, together with the need for more accurate and higher-pressure instrumentation, have prompted the development of digital pressure transducers capable of precision measurements in pressure ranges up to about 250 MPa. One exemplary high-precision digital pressure sensor operates on the principle of changing the resonant frequency of load-sensitive quartz crystals with pressure-induced stress. Frequency signals from the quartz crystals are counted and linearized through microprocessor-based electronics to provide two-way communication and control in digital formats. The aforementioned quartz crystal pressure transducers have a resolution as good as a few parts per billion and have been used to determine the performance of high precision, primary standard dead-weight testers.

One example of a surface-micromachined resonant sensor has a resonant strain gage formed from a deposited thin film of polysilicon with an integral vacuum cavity surrounding the resonator. Several patents providing background to such resonant sensors include "Dielectrically isolated resonant microsensors," U.S. Pat. No. 5,417,115, Burns, issued May 23, 1995; "Static pressure compensation of resonant integrated microbeam sensors," U.S. Pat. No. 5,458,000, Burns et al., issued Oct. 17, 1995; "Cantilevered microbeam temperature sensor;" U.S. Pat. No. 5,511,427, Burns, issued Apr. 30, 1996; "Method for making a thin film resonant microbeam absolute;" U.S. Pat. No. 5,747,705 Herb et al., issued May 5, 1998; and "Thin film resonant microbeam absolute pressure sensor," U.S. Pat. No. 5,808,210 Herb et al., issued Sep. 15, 1998.

Another example of a resonant pressure sensor, which is fabricated from single-crystal silicon, is disclosed in "Semiconductor pressure sensor and its manufacturing method," Watanabe et al., U.S. Pat. No. 5,880,509 issued Mar. 9, 1999. The sensor comprises a single-crystal silicon substrate, a closed air-gap chamber, a measured diaphragm made by epitaxial growth, and a strain detection element incorporated in the measuring diaphragm.

The operation of a resonant pressure sensor requires a resonator to be excited into vibrational motion and detection of this motion. Forces and moments are applied that bend, twist, elongate or contract the resonator. Various methods for excitation and detection of resonant sensors have been proposed including thermal excitation with piezoresistive detection; electrostatic excitation with capacitive detection; Lorentz force excitation with magnetic flux detection; piezoelectric excitation with piezoelectric detection, and optical excitation with optical detection. In an exemplary method, resonant microbeams are driven and sensed by a single multimode optical fiber using a strain-sensitive oscillator, as described in "Fiber-optic vibration sensor based on frequency modulation of light-excited oscillators," U.S. Pat. No. 6,246, 638, Zook et al., issued Jun. 12, 2001. A suggested method for driving and sensing a resonant sensor by using modulated and unmodulated light from multiple light sources is described in "Multi-wavelength optical drive/sense readout for resonant microstructures," U.S. Pat. No. 5,844,236, Wilson, issued Dec. 1, 1998. A photodetector detects the filtered reflected light to determine the resonant frequency of the resonator.

Resonators may be hermetically sealed in an evacuated cavity or enclosure to provide separation from the surrounding environment, eliminating effects such as air damping of the resonator and mass loading on the resonator body.

Micro-electrical-mechanical systems (MEMS) researchers are working on producing precision resonant pressure sensors having increased noise immunity, intrinsic safety, and long line-driving capability. It is desirable that a pressure sensor can operate in the harsh conditions associated with, for example, turbine engines, high-speed combustors, and other aerospace and industrial applications.

Because of limitations in the use of electrically powered/electrical output sensors in high-noise environments, hazardous areas, and some medical applications, it is advantageous to combine the precision of resonator-based sensors with the total optical isolation of fiber-optic technology. One method of optically powering a resonant low-pressure sensor is described in "Optically powered resonant integrated microstructure pressure sensor," Youngner, U.S. Pat. No. 6,710,355, issued Mar. 23, 2004.

In the pressure-sensor industry and other sensor application areas, the need exists for precise and stable sensors having low hysteresis, remote access, electromagnetic interference (EMI) immunity, and increased safety in harsh, volatile, or explosive environments with the elimination of voltage and electronic circuitry at the sensor element. Additional features that are desirable for resonant sensors include a simplified fabrication process, integral vacuum sealing, reduction or elimination of stiction and snap-down or pull-in problems associated with the resonator, accurate positioning of the drive and sense electrodes, alignment of the phase between the drive frequency and resonator movement over a wide frequency range, high signal-to-noise ratio of the detected signal, simplification of the optical interface to the resonator, and the opportunity for relatively easy integration of the sensor with more complex fabrication processes such as complementary metal-oxide-semiconductor (CMOS) and bipolar complementary metal-oxide-semiconductor (BiCMOS) processes.

SUMMARY OF THE INVENTION

One aspect of the invention is a method for determining a resonant frequency of an optically coupled resonator. An incident light is modulated, a laterally offset photodiode is struck with the modulated incident light, and an electric field is generated between the laterally offset photodiode and the resonator in response to the modulated incident light. The resonator is driven with a driving component of the generated electric field. A reflected light from the resonator is sensed, and the resonant frequency of the resonator is determined based on the reflected light.

Another aspect of the invention is a system for determining a resonant frequency of an optically coupled resonator. The system includes means for modulating an incident light; means for striking a laterally offset photodiode with the modulated incident light; means for generating an electric field between the laterally offset photodiode and the resonator in response to the modulated incident light; means for driving the resonator with a driving component of the generated electric field; means for sensing a reflected light from the resonator; and means for determining the resonant frequency of the resonator based on the reflected light.

Another aspect of the invention is a method of sensing an applied stimulus. An optically coupled resonator having a laterally offset photodiode is driven with an incident light. One or more resonant frequencies of the resonator are sensed with a reflected light from the resonator. The applied stimulus is determined based on the sensed resonant frequency.

Other aspects, features and attendant advantages of the present invention will become more apparent and readily appreciated by the detailed description given below in conjunction with the accompanying drawings. The drawings should not be taken to limit the invention to the specific embodiments, but are for explanation and understanding and are not necessarily drawn to scale. The detailed description and drawings are merely illustrative of the invention rather than limiting, the scope of the invention being defined by the appended claims and equivalents thereof.

BRIEF DESCRIPTION OF THE DRAWINGS

Various embodiments of the present invention are illustrated by the accompanying figures, wherein:

FIG. 6a through FIG. 6j illustrate methods of determining a resonant frequency of an optically coupled resonator, in accordance with other embodiments of the current invention;

DETAILED DESCRIPTION OF THE INVENTION

Figure 1:
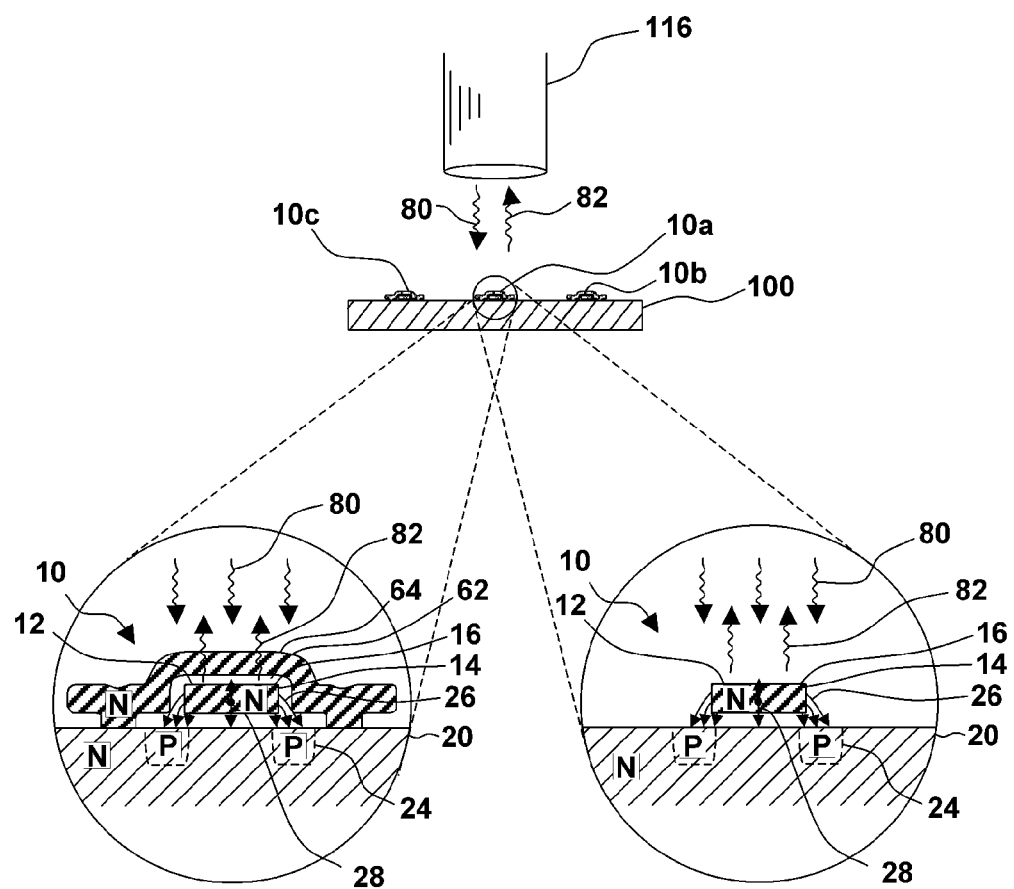
FIG. 1 illustrates a system for determining a resonant frequency of an optically coupled resonator, in accordance with one embodiment of the current invention.

FIG. 1 illustrates a system for determining a resonant frequency of an optically coupled resonator, in accordance with one embodiment of the present invention. For the description of this figure and the figures that follow, similarly numbered objects correspond to similar elements. Optically coupled resonator 10 is fixedly attached to semiconductor substrate 20 at one or more attachment locations. Resonator 10 includes resonator body 12 with one or more resonator sidewalls 14 and resonator surfaces 16. Laterally offset photodiode 24 may be formed in semiconductor substrate 20 adjacent to resonator 10. Photodiode 24 or a laterally offset electrode connected thereto is positioned laterally off to a side of one or more sidewalls 14 of resonator body 12, and is in a different plane than resonator body 12. Incident light 80 is directed at resonator 10 via optical fiber 116, such as a single mode or multi-mode glass or plastic optical fiber. Optical elements such as a lens (not shown) may be included to aid in directing light between optical fiber 116 and resonator 10. Incident light 80 is modulated and directed to strike laterally offset photodiode 24 and to generate electric field 26 between laterally offset photodiode 24 and resonator 10. With laterally offset photodiode 24, resonator 10 is driven with driving component 28 of generated electric field 26. With an appropriately sized and positioned laterally offset photodiode 24, driving component 28 of generated electric field 26 diminishes when resonator 10 is displaced.

One aspect of laterally offset photodiode 24 is that driving component 28 of generated electric field 26 can diminish when resonator body 12 is displaced towards semiconductor substrate 20. A desirable attribute is that generated electric field 26 between laterally offset photodiode 24 and resonator body 12 diminishes when resonator body 12 is displaced, thereby preventing electrostatic pull-in, an unstable position whereby a portion of resonator body 12 is electrostatically attracted to and may become stuck against semiconductor substrate 20. Electrostatic pull-in, also referred to as snap-down or snap-in, may be avoided with sufficient lateral space between sidewall 14 of resonator 10 and laterally offset photodiode 24. With laterally offset photodiode 24 or a laterally offset electrode attached thereto, larger gaps between resonator body 12 and semiconductor substrate 20 are attainable to reduce the possibility of stiction during fabrication. Another desirable attribute is that laterally offset photodiode 24 can generate driving component 28 of electric field 26 substantially in phase with a vibrating velocity of resonator body 12 with appropriate modulation of incident light 80, allowing operation over a wide range of frequencies without undue correction for phase shifts.

Reflected light 82 from one or more resonator surfaces 16 is collected by optical fiber 116 and used to determine one or more resonant frequencies of resonator 10. One or more resonant frequencies of one or more resonators may be analyzed to determine a value of an applied stimulus. Incident light 80 that is reflected from resonator 10 may be modulated by displacements of the resonator via optical phenomena such as light interference between the resonator body, shell and substrate, light diffraction, variations in reflectivity, and reflectance angle variations at points along resonator body 12.

Resonator 10a and other resonators on or in substrate 20 may have one of various geometries such as a rectangular geometry, a circular geometry, a ring geometry, an x-shaped geometry or other geometries including singly and doubly supported designs, layered resonators, tuning forks, balanced configurations, and other geometries. Resonator 10 and other resonators on sensor die 100 may be formed from, for example a material such as amorphous silicon, polycrystalline silicon also known as polysilicon, epi-poly, epitaxial silicon, single-crystal silicon, silicon-germanium, silicon carbide, diamond, or a combination thereof that is deposited or otherwise formed on semiconductor substrate 20 or on a sacrificial layer formed thereon. For example, patterning and etching techniques in combination with the use of selectively removed sacrificial layers may be used to form resonator 10 and to seal resonator 10 with optional resonator shell 64. Resonator shell 64 may be included around resonator body 12 and laterally offset photodiode 24 to allow resonator 10 to vibrate freely with minimal viscous damping forces within resonator cavity 62 between resonator shell 64 and resonator body 12. Resonator shell 64 may be sealed and may contain a vacuum. Resonator body 12 may be fixedly attached to semiconductor substrate 20 at one attachment location, such as at a supported end of a cantilevered beam or at the center of a ring or disk resonator. Alternatively, resonator 10 may be fixedly attached to semiconductor substrate 20 at opposite ends of resonator body 12 as in a clamped-clamped beam such that mechanical strain applied to the opposite ends causes a shift in one or more resonant frequencies of resonator 10.

Sensor die 100 may be formed from a portion of semiconductor substrate 20, such as an n-type or p-type single-crystal silicon wafer, a silicon-on-insulator wafer, a double-SOI wafer, or other suitable substrate. Substrate 20, although presently preferred to comprise silicon, may comprise other materials such as silicon carbide, quartz, Pyrex®, glass, metal, ceramic, plastic, an insulative material, a semiconductor material, a conductive material, or a combination thereof.

Multiple resonators 10 may be included on semiconductor substrate 20. For example, resonator 10a is centered on sensor die 100. Stimulus such as axial strain applied to ends of resonator 10 causes a frequency shift in one or more resonator frequencies of resonator 10. For example, the applied stimulus may be determined based on the resonant shifts of one or more resonant frequencies of resonator 10a. Additional resonators 10b and 10c attached to semiconductor substrate 20 may also be optically coupled to optical fiber 116. Alternatively, one or more additional resonators 10b and 10c attached to semiconductor substrate 20 may be mechanically coupled to optically coupled resonator 10a via vibrations of semiconductor substrate 20, such that optical excitation and interrogation of resonator 10a reveals one or more resonant frequencies of additional resonators 10b and 10c. For example, second resonator 10b is fixedly attached to semiconductor substrate 20 at two attachment locations. Stimulus such as axial strain applied to ends of resonator 10b causes shifts in one or more resonant frequencies of resonator 10b, which may be in a direction opposite that of resonant frequency shifts of resonator 10a. Resonator 10c may be fixedly attached at a single attachment location to semiconductor substrate 20. A shift in temperature of semiconductor substrate 20 causes resonant frequency shifts in one or more resonant frequencies of resonator 10c to allow temperature compensation for measurements of the applied stimulus and optionally a measure of temperature. Incident light 80 may be modulated to determine one or more resonant frequencies of resonators 10b and 10c that are mechanically coupled to optically coupled resonator 10a or optically coupled to optical fiber 116.

Resonator shell 64 may be included around resonator body 12 of resonator 10 and laterally offset photodiode 24 to allow vibrations of resonator 10 within resonator cavity 62 between resonator shell 64 and resonator body 12. Resonator shell 64 is at least partially transmissive to incident light 80 and reflected light 82 to allow optical drive and sense. Additional mechanical features such as a deformable diaphragm for a pressure sensor or flexures for an accelerometer or rotation sensor may be included with sensor die 100, and resonators 10 with or without resonator shells appropriately placed thereon.

Resonator body 12 may be formed from, for example, a material such as amorphous silicon, polycrystalline silicon, epi-poly, epitaxial silicon, single-crystal silicon, silicon-germanium, silicon carbide, diamond, or a combination thereof that is deposited or otherwise formed on semiconductor substrate 20 or on a sacrificial layer formed thereon. Resonator shell 64 may be formed from a material such as amorphous silicon, polycrystalline silicon, epi-poly, epitaxial silicon, single-crystal silicon, silicon-germanium, silicon carbide, diamond, a transparent or semitransparent material such as silicon nitride, aluminum nitride, silicon carbide, diamond and the like or a combination thereof.

In this and other figures, substrate 20 has been illustrated as an n-type semiconductor with a p-type implanted region to form photodiode 24. Alternatively, substrate 20 may be a p-type semiconductor with an n-type implanted region. Other methods to form photodiode 24 adjacent to resonator body 12 may be used, as is known to those skilled in the art. Photodiode 24, illustrated here as formed in semiconductor substrate 20, may alternatively be positioned underneath, to the side, on an upper surface or a sidewall of resonator body 12, or above resonator body 12 such as in resonator shell 64. In another embodiment, photodiode 24 is positioned farther away from resonator body 12 and electrically connected to a laterally offset electrode that is adjacent to resonator body 12. In another embodiment, a plurality of photodiodes 24 is positioned adjacent to selected portions of resonator body 12 to allow preferential excitation of higher order resonant modes. In other embodiments, photovoltage or photocurrent generated by photodiode 24 with vibrations of resonator body 12 provide input signals for on-board or off-chip electronic circuitry.

Although incident light 80 and reflected light 82 are shown as perpendicular to semiconductor substrate 20, it will be appreciated that other design variations exist, such as the use of angled incident and angled reflected light, or the use of light impinging from below through a suitably transmissive substrate. Although shown with a single optical fiber 116 for driving and detecting resonant frequencies of resonator 10, two or more optical fibers in a bundle or at various angles with respect to resonator 10 may be used. Incident light 80 may be comprised of a single wavelength of light or of multiple wavelengths of light, and may cover a narrow or broad range of wavelengths. In one example, incident light 80 of a single wavelength is partially reflected from a surface of resonator body 12. In another example, incident light 80 comprises two wavelengths from two light sources, one of which is used to generate the photovoltage while the other is used to determine vibrations or displacements of resonator body 12. In an alternative configuration, vibrations or displacements of resonator body 12 are detected with a second laterally offset photodiode, and the resulting electrical signal is processed by on-chip or off-chip electronics. In another alternative configuration, laterally offset photodiode 24 is configured in a self-resonant mode wherein lateral or flexural displacements of resonator body 12 diminish the intensity of incident light 80 striking the photodiode, which in turn reduce driving force 28 and allow resonator 10 to return towards an equilibrium position. The driving cycle is then repeated.

Although a resonator attached to the substrate at one or both ends is implied by the illustrations, resonator designs such as cantilevered resonators, doubly supported resonators, cross resonators, butterfly resonators, crisscross resonators, single-ended and double-ended tuning fork resonators, single-ended and double-ended trident resonators, lobed resonators, circular resonators, oval resonators, ring resonators, beam resonators, balanced resonators, thin-beam resonators, cantilevered resonators with enlarged ends, tandem resonators, tandem resonators with enlarged ends, high-Q resonators, disk resonators, comb resonators, flexural resonators, torsional resonators, combination flexural/torsional resonators, lateral resonators, substrate resonators, bulk-mode resonators, surface-mode resonators, higher-mode resonators, resonators with one or more centered or offset holes, open-air resonators without a lid or shell, multiple resonators, resonator arrays, or combinations thereof may be incorporated. Open-air resonators without a lid or shell may have specialized coatings for attracting specific target chemical and biological species that can be detected via changes in resonator frequencies and properties.

The laterally offset photodiode, although shown in close proximity to the resonator body, may be positioned farther away from the resonator and be electrically connected to a laterally offset electrode that is proximate to the resonator body. In one example, the photodiode is positioned in the resonator shell.

In other embodiments, the resonator shell is omitted from the resonator. The resonator body may be exposed to atmospheric conditions, or may be placed in a suitable package that is evacuated or filled with a controlled gas.

In other embodiments, a thermally absorptive feature or material (not shown) is selectively formed or placed on or near the resonator body to allow photothermal excitation of the resonator. Alternatively, light may be focused on a portion of the resonator body to incite vibrations.

The resonators and frequency-determination methods described can be adapted to electrically coupled resonant devices, foregoing the need for optical connectivity. On-chip integrated circuitry or bondwire connections to external circuitry can be provided for generating and processing the output from the resonator.

Figure 2:
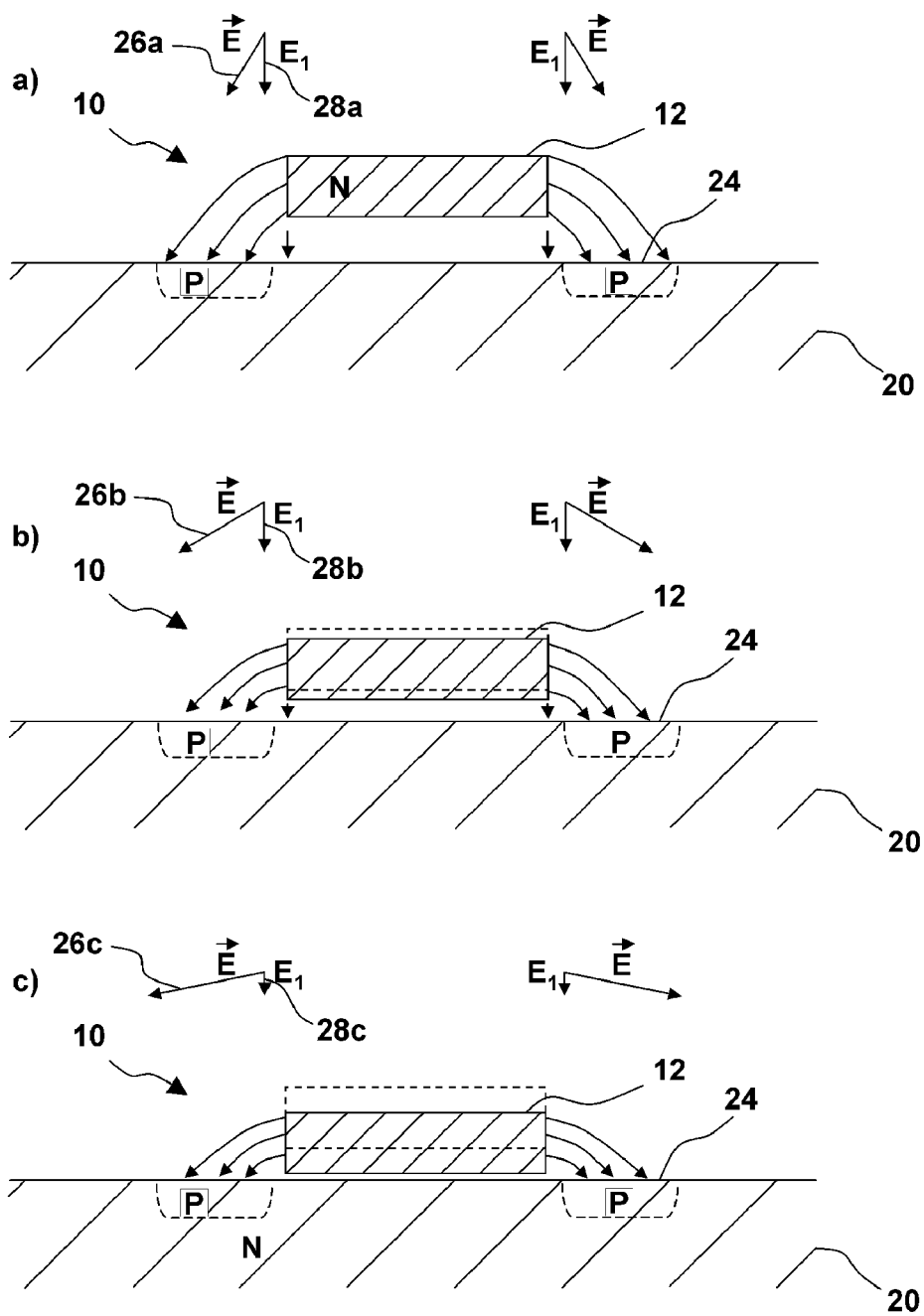
FIG. 2 illustrates a method for determining a resonant frequency of an optically coupled resonator, in accordance with one embodiment of the current invention.

FIG. 2 illustrates a method for determining a resonant frequency of an optically coupled resonator, in accordance with one embodiment of the present invention. Optically coupled resonator 10 is driven when laterally offset photodiode 24 is struck with pulsed or otherwise modulated incident light such as a sine wave, a half-sine wave, a square wave, or a series of short pulses at the resonant frequency of resonator 10 or a multiple or submultiple thereof. Alternatively, the resonator may be excited by scanning through one or more resonant frequencies, subharmonics or multiples thereof with one of a variety of modulation waveforms. A weighted average of frequency with signal amplitude for multiple measurements around a peak or other averaging or curve fitting techniques can be used to determine peak location. In another alternative, a sharp pulse of light is applied to excite the resonator, then the resonator vibrations are detected as the oscillations subside. In another alternative, relatively short bursts of light with a predetermined waveform having frequency content to excite one or more modes of one or more resonators can be applied, followed by a ring-down period in which the resonant frequencies can be determined.

Electric field 26 is generated between laterally offset photodiode 24 and a portion of resonator 10, such as a lower surface or a resonator sidewall, in response to incident light. Resonator 10 is driven with driving component 28 of electric field 26. Based in part on the lateral space between laterally offset photodiode 24 and resonator body 12, driving component 28 of electric field 26 diminishes when resonator 10 is displaced. FIG. 2a illustrates undeflected resonator 10 in a resting or equilibrium position. Incident light is applied and driving component 28a of electric field 26a provides a force to pull resonator 10 toward semiconductor substrate 20. As resonator 10 is displaced towards semiconductor substrate 20, electric field 26b increases while driving component 28b decreases, as illustrated in FIG. 2b. As resonator 10 is further displaced towards semiconductor substrate 20, electric field 26c further increases while driving component 28c further decreases, as illustrated in FIG. 2c.

Mechanical restoring forces pull resonator 10 back towards the equilibrium position when incident light is removed. Timed injections of incident light may be used to stimulate and excite resonator 10 into one or more resonant modes, whose resonant frequencies can be determined, for example, with reflected light from one or more resonator surfaces. Mechanical strain may be applied to opposite ends of resonator 10 to shift one or more resonant frequencies of resonator 10. The shift in resonant frequency is measured to determine the applied mechanical strain.

Various configurations and types of sources of incident light, sources of reflected light, and filtering may be used to drive and sense resonator 10.

Figure 3:
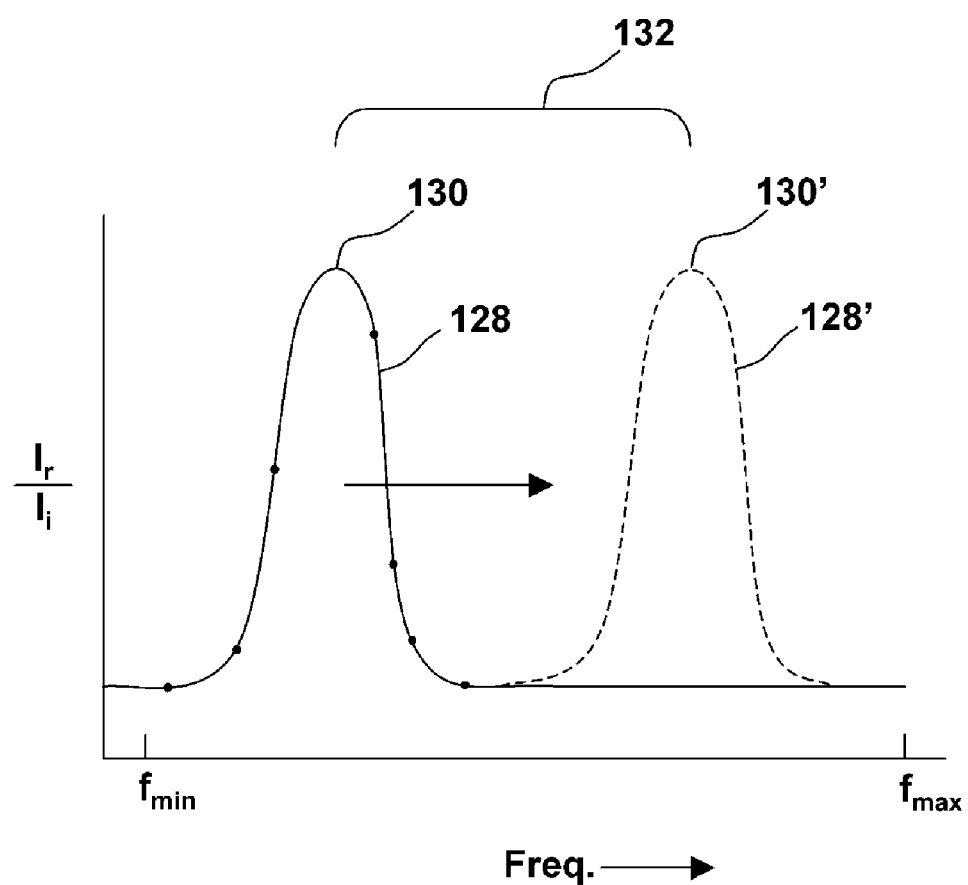
FIG. 3 is a graph illustrating a method for sensing an applied stimulus, in accordance with one embodiment of the current invention.

FIG. 3 is a graph illustrating a method for sensing an applied stimulus, in accordance with one embodiment of the present invention. Response curve 128 shows exemplary ratios of reflected light $I_r$ to incident light $I_i$ as the incident light is intensity modulated over a frequency range extending from $f_{min}$ to $f_{max}$. As the incident light is scanned through resonant frequency 130 of an optically coupled resonator, vibrations of the resonator are excited and can build up to large amplitudes of deflection. As the resonator is periodically displaced, the intensity of the reflected light $I_r$ varies accordingly. When an external stimulus such as mechanical strain is applied to opposite ends of the resonator, resonant frequency 130 of the resonator shifts up or down based on the applied strain being tensile or compressive. Shifted response curve 128' shows shifted resonant frequency 130' with resonant frequency shift 132 that may be used to determine the value of the external stimulus. Since the resonator may have multiple resonant frequencies, scanning through one or more resonant frequencies reveals each frequency in turn. One or more resonant frequencies 130 of the resonator may be sensed with reflected light from the resonator. One or more resonant frequencies 130 and shifted resonant frequencies 130' or frequency shifts 132 may be analyzed to determine a value of the applied stimulus.

Various methods may be employed to determine one or more resonant frequencies 130 of the resonator. In a first example, a measurement of reflected light at a first modulation frequency may be compared to a measurement of reflected light at a second modulation frequency to determine resonant frequency 130 of the resonator. The first modulation frequency is at or near resonant frequency 130 of the resonator and the second modulation frequency is away from resonant frequency 130 of the resonator.

In a second example, modulated incident light is scanned through a predetermined range of frequencies including at least one resonant frequency 130 of the resonator. One or more resonant frequencies 130 may be determined by numerically fitting sensed reflected light with corresponding frequencies using, for example, a suitable model for determining the frequency corresponding to one or more peaks of the response curve. The incident light may be scanned, for example, over a small frequency range about one or more previously detected resonant frequencies.

In a third example, incident light is modulated at or near previously determined resonant frequency 130 of the resonator to track resonant frequency 130. The scan frequency may be varied in small amounts around the previously determined resonant frequency to aid in rapid location of shifted resonant frequency 130' and to ensure accurate determination of each frequency peak.

In a fourth example, a phase of the incident light is compared to a phase of the reflected light to determine resonant frequency 130 of the resonator. A lag in phase or a lead in phase indicates movement of resonant frequency 130. Modulation of incident light may be adjusted to track and lock into the shifted frequency. The modulation of the incident light may be open loop or closed loop.

Figure 4:
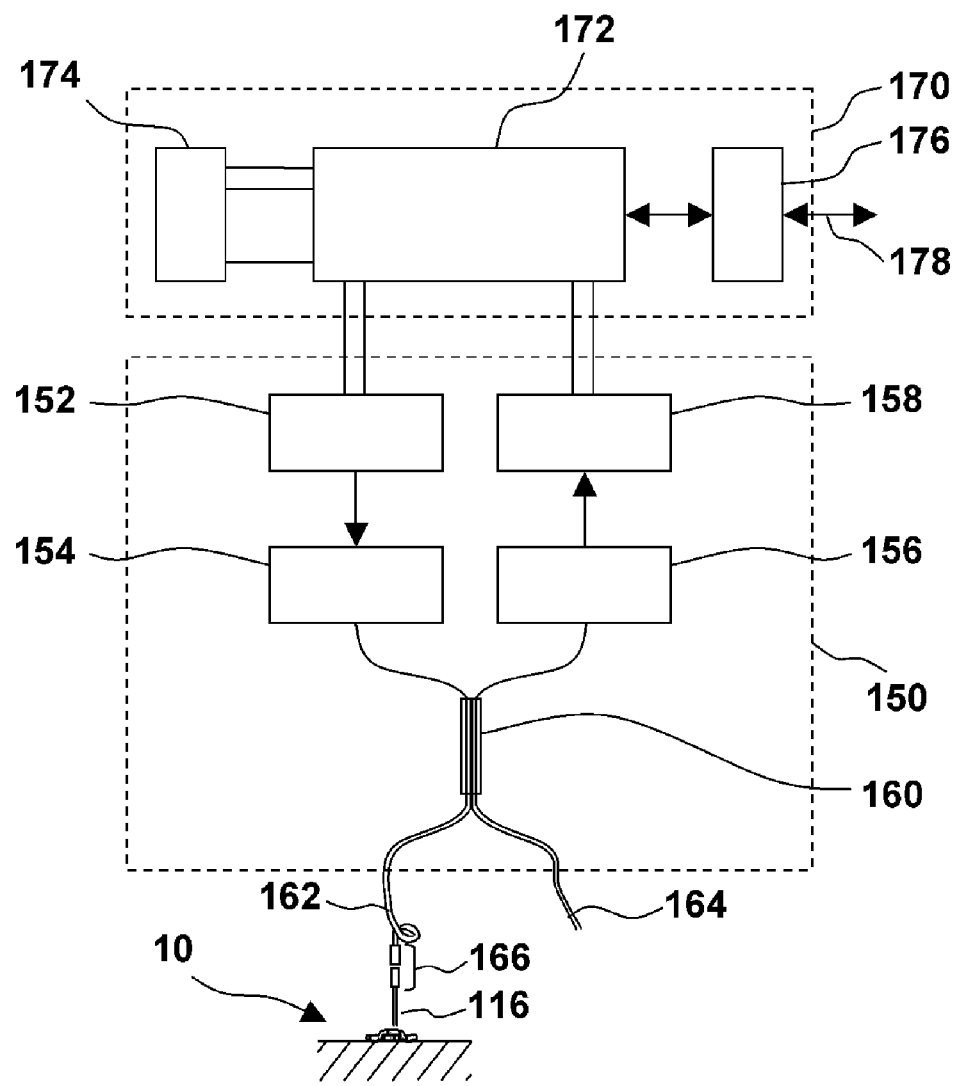
FIG. 4 illustrates a system for determining a resonant frequency of an optically coupled resonator, in accordance with another embodiment of the current invention.

FIG. 4 illustrates a system for determining a resonant frequency of an optically coupled resonator, in accordance with another embodiment of the present invention. Electro-opto-electronic module 150 generates incident light and detects reflected light from one or more optically coupled resonators 10 via optical fiber 116. Optical elements such as a lens (not shown) may be included to aid in directing light between optical fiber 116 and resonator 10. One or more light sources 152 such as light-emitting diodes, laser diodes, or other suitable light sources provide light to drive and sense vibrations of resonator 10. Source optics 154 such as filters, lenses, couplers, combiners or optical modulators may be included between light sources 152 and resonator 10. Incident light is modulated, for example, by varying the supply voltage to light source 152 or by controlling the amount of light passing through an optical modulator within source optics 154. Reflected light is detected with one or more light detectors 158 such as a photodiode, a photodetector, or an optical detector array. Detector optics 156 such as filters, lenses, couplers or splitters may be positioned between resonator 10 and light detectors 158.

Two-by-two coupler 160 allows incident light from light source 152 to be directed through optical fiber 162 and optical fiber 116 onto resonator 10. Optional fiber connector 166 such as an SMA connector allows optical fiber 116 to be modularly disconnected from module 150. Reflected light from resonator 10 returns through optical fiber 116 and optical fiber 162, through two-by-two coupler 160, through detector optics 156 and onto light detectors 158. In one example, optical fiber 164 of optical coupler 160 is terminated. In another example, optical fiber 164, which contains a sample of incident light from one or more light sources 152, is looped and coupled to one or more light detectors 158 to allow an intensity and/or phase comparison between incident light and reflected light from resonator 10. A three-by-three or larger coupler may be used in a similar manner as two-by-two coupler 160 to allow coupling and detection of multiple light sources for driving and detection of resonator 10. Although illustrated with a single fiber 116 coupled to resonator 10, two or more optical fibers may be coupled to one or more resonators 10.

Electronic module 170 includes controller 172 and memory 174. Controller 172 executes computer programming code and provides light control signals to turn on and off or otherwise modulate light sources 152. Conditioned electronic signals from light detector 158 are provided to controller 172 to allow determination of one or more resonant frequencies of resonator 10 and to allow analysis thereof, such as determining a value of an applied stimulus. Incident light may be modulated to determine one or more resonant frequencies of additional optically coupled resonators 10 or of additional resonators 10 that are mechanically coupled to resonator 10. Output data 178 such as raw light signal levels or fully analyzed and formatted output data are communicated externally through unidirectional or bi-directional port 176 such as a USB port, a wired connection, or a wireless connection.

Additional circuitry may be included, for example, to amplify or otherwise condition signals within the system. For example, a phase lock loop or lock-in amplifier may be used to track a resonant frequency of a resonator and changes thereto. A digital frequency synthesizer or a frequency generation circuit may be inserted between controller 172 and light sources 152. Varying numbers and combinations of the electronic, optical, and opto-electronic modules or devices that have been described may be combined with resonator 10 on a substrate. Wireless transmitters and receivers may be incorporated in electronic module 170 to generate and receive data remotely such as over a wireless sensor network.

Figure 5:
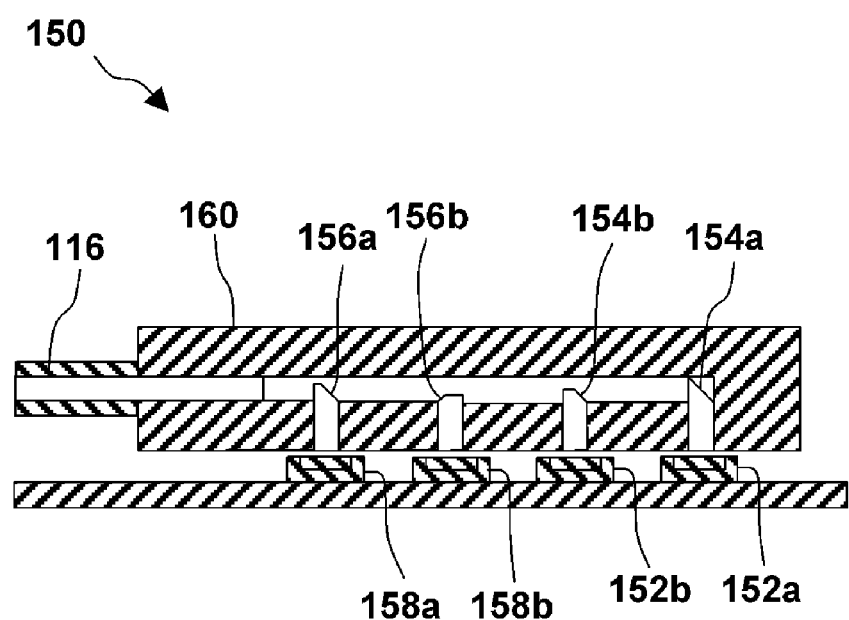
FIG. 5 illustrates an optical system for coupling to an optically coupled resonator, in accordance with another embodiment of the current invention.

FIG. 5 illustrates an optical system for coupling to an optically coupled resonator, in accordance with another embodiment of the present invention. Electro-opto-electronic module 150 generates incident light and detects reflected light from one or more optically coupled resonators via optical fiber 116. Light sources 152a and 152b provide light to drive and sense vibrations of the resonator. Source optics 154a and 154b comprising relatively short segments of optical fiber with beveled and mirrored ends direct light from light sources 152a and 152b towards the resonator. The incident light from one or both light sources may be modulated. Reflected light is detected with light detectors 158a and 158b. Detector optics 156a and 156b also comprising segments of optical fiber with beveled ends extract reflected light from the resonator. Open cavities within optical coupler 160 may be filled, for example, with an indexed-matched gel to guide the incident and reflected light.

FIG. 6a through FIG. 6j illustrate methods of determining a resonant frequency of an optically coupled resonator, in accordance with other embodiments of the present invention. The shape of the intensity curves for the incident and reflected light sources of the incident and reflected light is illustrative and may depart significantly from the bell-shaped curves shown. The descriptions of the exemplary intensity curves reference resonator 10, as presented with FIG. 1. Intensity curves of incident light $I_i$ and reflected light $I_r$ are plotted with respect to the inverse of the wavelength λ.

In a first example, incident light 80a is modulated over a narrow band as in FIG. 6a. Incident light 80a over a narrow band is provided, for example, from a filtered light bulb or other incandescent source, a filtered light-emitting diode, or an unfiltered diode laser. Reflected light 82a is sensed over a broad band that includes the narrow band of modulated incident light 80a. The result is that a first light source provides modulated incident light 80a to drive resonator 10, and a second light source provides unmodulated light over a broad band such as from a light bulb or other incandescent source, or an unfiltered light-emitting diode that is directed to and subsequently reflected from a surface of resonator 10 to detect vibrations of resonator 10. Alternatively, a single light source in combination with one or more optical elements such as a filter may provide light for driving and detecting resonator 10.

In a second example, incident light 80b is modulated over a narrow band, and reflected light 82b is sensed over a broad band that excludes the narrow band of modulated incident light 80b, as in FIG. 6b. A first light source provides modulated incident light 80b over a narrow band and a second light source provides unmodulated light over a broad band that is higher or lower in wavelength than incident light 80b. Alternatively, a single light source may be used to supply incident light 80b and reflected light 82b with appropriate filtering of incident light 80b and reflected light 82b.

In a third example, incident light 80c over a broad band is modulated, as in FIG. 6c. Incident light 80c over a broad band is provided, for example, from a light bulb or other incandescent source, or an unfiltered light-emitting diode. Reflected light 82c over a narrow band, which is included within the broad band of modulated incident light 80c, is sensed. In this example, a single light source may be used to supply incident light 80c and reflected light 82c with appropriate filtering of reflected light 82c. Alternatively, two light sources may be used, the second being a source of narrow-band light such as from a filtered light bulb or other incandescent source, a filtered light-emitting diode, or an unfiltered diode laser.

In a fourth example, incident light 80d is modulated over a broad band, and reflected light 82d is sensed over a narrow band not included within the broad band of modulated incident light 80d, as in FIG. 6d. A first light source provides incident light 80d, and a second light source provides reflected light 82d. Alternatively, a single light source may be used to supply incident light 80d and reflected light 82d with appropriate filtering of incident light 80d and reflected light 82d.

In a fifth example, incident light 80e is modulated over a first narrow band. Reflected light 82e is sensed over a second narrow band that is different from the first narrow band, as in FIG. 6e. Different light sources may be used to provide incident light 80e and reflected light 82e. Alternatively, a single source of broad-band light may be filtered to provide incident light 80e and reflected light 82e, where incident light 80e is modulated and reflected light 82e is unmodulated prior to being reflected off a surface of resonator 10.

In a sixth example, incident light 80f of a first wavelength is modulated, and reflected light 82f of a second wavelength different from the first wavelength is sensed, as in FIG. 6f. Incident light 80f may be provided, for example, from a highly filtered light bulb or incandescent light source, a highly filtered light-emitting diode, or a filtered diode laser. Reflected light 82f may be provided, for example, from a highly filtered light bulb or incandescent light source, a highly filtered light-emitting diode, or a filtered diode laser. One or two light sources may be used to provide incident light 80f and reflected light 82f.

In a seventh example, incident light 80g of a first wavelength is modulated, as in FIG. 6g. Reflected light 82g of a second wavelength that is substantially the same as the first wavelength is sensed, such as from the same light source as incident light 80g.

In an eighth example, incident light 80h is modulated over a first narrow band, and reflected light 82h over a second narrow band that is substantially the same as the first narrow band is sensed, as in FIG. 6h. One or two light sources may be used to provide incident light 80h and reflected light 82h.

In a ninth example, incident light 80i over a first broad band is modulated, as in FIG. 6i. Reflected light 82i over a second broad band that is substantially the same as the first broad band is sensed. One or two light sources may be used to provide incident light 80i and reflected light 82i.

In a tenth example, incident light 80j over a broad band excluding a stop band within the broad band is modulated, as in FIG. 6j. Reflected light 82j within the stop band is sensed to detect vibrations of resonator 10. Reflected light 82j is unmodulated prior to reflecting from resonator 10. Using suitable filtering and an optical modulator, a single light source may be used to supply incident light 80j and reflected light 82j.

Combinations of one or more drive and sense methods may be used. For example, modulation of a broad band of wavelengths may be used initially to locate resonances of a resonator, followed by modulation over a narrow band or at a single wavelength that is used to increase signal detection capability.

Alternative optical schemes may be employed to excite and sense resonant frequencies while reducing the effect of inadvertent reflections and capacitive coupling to improve resonant-frequency detection. For example, a light source for detecting resonator vibrations may be frequency-modulated or pulsed at a frequency much higher than any resonant frequency of interest, then filtered using passive, active or digital filtering to detect the resonant frequencies.

Electronic methods may be employed to excite one or more resonant frequencies of the resonator while detecting resonances with high signal-to-noise ratios. In one example, a light source may be scanned through or modulated at an integral multiple of the resonant frequency of the resonator, and electronic filtering may be used to filter out the higher frequency components and to detect the resonator resonant frequency. In another example, incident light is pulsed at a resonant frequency of the resonator or a multiple thereof, then reduced in intensity to a constant, low-level value that allows resonator vibrations to be detected. In another example, the resonator is excited into a resonant mode with modulation of the incident light, and then the resonant mode decays or rings down while a constant, low intensity light source allows the resonant frequency of the resonator to be detected with minimal effects of frequency pulling. In another example, a large pulse or many frequencies across a wide band region that includes one or more resonant frequencies, is applied to one or more resonators, and then the resonators are allowed to ring down while the resonant frequencies are detected with, for example, low-level light of constant intensity. In another example, one or more resonators that are driven mechanically into resonance with, for example, a piezoelectric driver, and optical methods are used to determine the resonant frequencies. In yet another example, one or more resonators are driven electrically with voltage applied to a laterally offset electrode, and the resonator frequencies are detected optically. In another example, one or more resonators are driven optically while resonators are detected, for example, with capacitive, piezoresistive, magnetic, or piezoelectric detection schemes.

Figure 7:
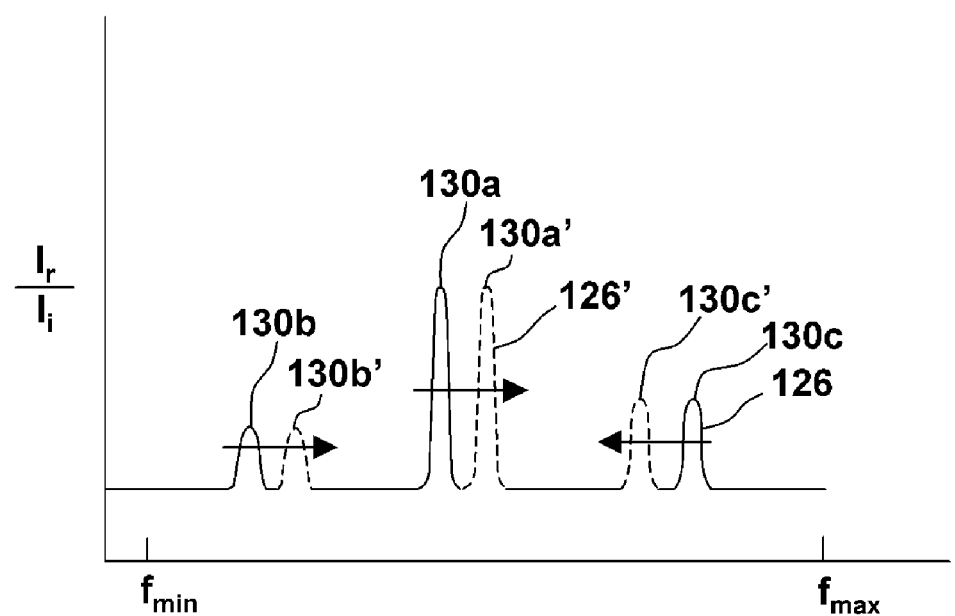
FIG. 7 is a graph illustrating a method of determining resonant frequencies of one or more resonators, in accordance with one embodiment of the current invention.

FIG. 7 is a graph illustrating a method of determining resonant frequencies of one or more resonators, in accordance with one embodiment of the present invention. Response curve 126 shows exemplary ratios of reflected light $I_r$ to incident light $I_i$ as the incident light is intensity-modulated over a frequency range extending from $f_{min}$ to $f_{max}$ that spans resonant frequencies 130a, 130b and 130c of three resonators 10a, 10b and 10c, respectively. Incident light may be modulated to determine one or more resonant frequencies 130b and 130c of optically or mechanically coupled resonators 10b and 10c.

As incident light is scanned through resonant frequencies 130a, 130b and 130c of resonators 10a, 10b and 10c, vibrations of each resonator 10a, 10b and 10c are excited in turn. Resonant frequencies 130a, 130b and 130c of resonators 10a, 10b and 10c are sensed with reflected light from one or more surfaces of resonators 10a, 10b and 10c. As resonators 10 are periodically displaced, the intensity of the reflected light $I_r$ varies accordingly. When an external stimulus such as mechanical strain is applied to opposite ends of resonator 10, resonant frequencies 130a, 130b and 130c of resonators 10a, 10b and 10c shift up or down based on the applied strain being tensile or compressive. Shifted response curve 126' shows shifted resonant frequencies 130a', 130b' and 130c' with resonant frequency shifts, from which the external stimulus may be deduced. Each resonator 10a, 10b and 10c have multiple resonant frequencies 130, and scanning may reveal each frequency in turn. Determined resonant frequencies 130a, 130b and 130c may be analyzed to determine a value of the applied stimulus. The applied stimulus is then determined based on one or more sensed resonant frequencies 130a, 130b and 130c.

Various methods may be employed to determine resonant frequency 130 of resonator 10, as described with respect to FIG. 3.

Figure 8:
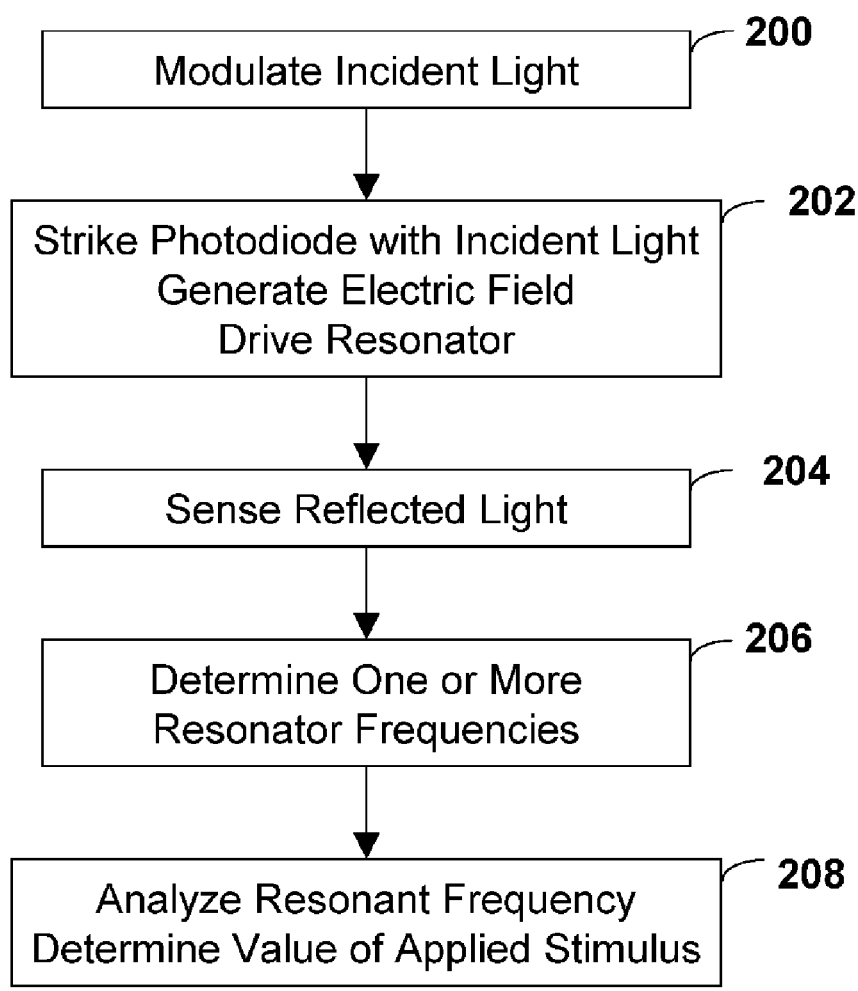
FIG. 8 is a flow diagram of a method for determining a resonant frequency of an optically coupled resonator, in accordance with another embodiment of the current invention.

FIG. 8 is a flow diagram of a method for determining a resonant frequency of an optically coupled resonator, in accordance with another embodiment of the present invention.

Incident light is modulated, as seen at block 200. Incident light from a light source, such as a light bulb or other incandescent source, an unfiltered light-emitting diode, a filtered light bulb or other incandescent source, a filtered light-emitting diode, an unfiltered diode laser, a highly filtered light bulb or incandescent light source, a highly filtered light-emitting diode, or a filtered diode laser, is pulsed or otherwise modulated. The pulses or modulations are created by varying, for example, the output light intensity or duration from the light source or by modulating light from the light source with an optical modulator placed in the light path of the incident light. The modulated incident light may include a broad band, a narrow band, or a single wavelength of light. A portion or the entire incident light from the light source may be modulated. For example, light from a single light source may be extracted into two separate light paths, where one path is modulated to provide incident light and the other path is unmodulated to provide reflected light. Filters such as band-stop filters may be included in the incident-light path to block incident light within the stop band, allowing the same or a second light source to provide reflected light. The incident light may be modulated at or near one or more resonant frequencies of the resonator. The incident light may be scanned, for example, through a predetermined range or through a set of one or more previously detected frequencies. The incident light may be modulated, for example, to determine one or more resonant frequencies of one or more optically coupled resonators or to one or more resonators mechanically coupled to one or more optically coupled resonators.

In a self-resonant mode, lateral displacements of the resonator body diminish the intensity of incident light striking the photodiode, which in turn reduce the driving force and allow the resonator to return towards an equilibrium position. The driving cycle is then repeated, allowing incident of constant intensity to excite the resonator into self-resonance.

A laterally offset photodiode is struck with the incident light, as seen at block 202. When the laterally offset photodiode is struck with the incident light, an electric field is generated and the resonator is driven. The electric field is generated between the laterally offset photodiode and the resonator in response to the modulated incident light. The resonator is driven with a driving component of the generated electric field. Depending on the degree of offset and the position of the laterally offset photodiode, the driving component of the generated electric field may diminish as resonator is displaced from an equilibrium or static position.

Reflected light from the resonator is sensed, as seen at block 204. Reflected light from the resonator is sensed with a suitable photodetector or optical detector array. In one example, light reflected from a resonator surface of the resonator is sensed over a broad band that may or may not include the modulated incident light. In another example, the reflected light is sensed over a narrow band that may or may not include the modulated incident light. In another example, the reflected light is sensed at a predetermined wavelength that may be the same as or different from the modulated incident light. In some cases, the reflected light is unmodulated prior to reflecting from the resonator. In other cases, the reflected light is modulated prior to reflecting from the resonator, and serves simultaneously to drive the resonator as well as to sense the resonator.

A resonant frequency of the resonator is determined, as seen at block 206. The resonant frequency of the resonator is determined based on reflected light from the resonator. Reflected light from a resonator surface of the resonator is measured to determine one or more resonant frequencies of the resonator or another resonator coupled thereto. In one example, a measurement of the reflected light at a first modulation frequency at or near the resonant frequency is compared to a measurement of the reflected light at a second modulation frequency away from the resonant frequency to determine the resonant frequency of the resonator. In another example, modulated incident light is scanned through a predetermined range of frequencies including one or more resonant frequencies of the resonator. The resonant frequency of the resonator may be determined, for example, by numerically fitting sensed reflected light from the resonator to an analytic model of a resonant peak, by determining the frequency at which the peak amplitude of the reflected light occurs, by locking in the frequency of the incident light to the resonant frequency of the resonator, by modulating the incident light at or near a previously determined resonant frequency to track the resonant frequency, by comparing a phase of the reflected light to a phase of the incident light, or by using another suitable method to determine the resonant frequency of the resonator and other resonators optically or mechanical coupled thereto.

The determined resonant frequencies are analyzed, as seen at block 208. The resonant frequencies of one or more resonators may be analyzed to determine a value of an applied stimulus. Applied pressure, acceleration, temperature, rotation, or other applied stimulus of a resonator may be determined by using analytical techniques such as mathematical modeling or other signal processing techniques such as a look-up table. For example, resonant frequencies of one or more resonators on a deformable diaphragm are detected. As pressure is applied to the deformable diaphragm, one or more resonant frequencies shift with the applied pressure. By detecting the shifted resonant frequencies, the pressure can be determined. Resonant frequencies of other resonators can be similarly detected to increase the accuracy and resolution of the pressure measurements, and to provide multivariable output such as differential pressure, temperature, and static pressure. Resonators with or without a vacuum-sealed resonator shell may be used in other devices such as a strain sensor, a pressure sensor, an accelerometer, an angular rate sensor, a temperature sensor, a chemical sensor, a biological sensor, an explosives detector, a radiation detector, a radio-frequency filter, a voltage-controlled oscillator, a mechanical oscillator, or a resonant device. The substrate may be shaped or otherwise sculpted, for example, to incur axial strain on the resonator with application of a stimulus such as applied pressure or acceleration. For example, the detected resonant frequencies can be analyzed to determine an applied stimulus such as mechanical strain that is exerted on the resonator by a suitable microstructure such as a pressure-sensing diaphragm, a flexure of an accelerometer, or a bending of the substrate attached thereto.

Further processing of the analyzed frequencies and collection of data can be directed by or displayed with the help of a graphical user interface.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are embraced herein.

What is claimed is:

1. A method for determining a resonant frequency of an optically coupled resonator, the method comprising:
    modulating an incident light;
    striking a photodiode laterally offset beyond a side of a resonator body with the modulated incident light;
    generating an electric field between the photodiode and the resonator body in response to the modulated incident light;
    driving the resonator with a driving component of the generated electric field;
    sensing a reflected light from the resonator; and
    determining the resonant frequency of the resonator based on the reflected light.

2. The method of claim 1, wherein the driving component of the generated electric field diminishes when the resonator is displaced.

3. The method of claim 1, wherein modulating the incident light comprises one of modulating a light source of the incident light or modulating light emitted from a light source of the incident light.

4. The method of claim 1, wherein modulating the incident light comprises modulating incident light over a narrow band, and wherein sensing the reflected light comprises sensing reflected light over a broad band, the broad band including the narrow band of the modulated incident light.

5. The method of claim 1, wherein modulating the incident light comprises modulating incident light over a narrow band, and wherein sensing the reflected light comprises sensing reflected light over a broad band, the broad band excluding the narrow band of the modulated incident light.

6. The method of claim 1, wherein modulating the incident light comprises modulating incident light over a broad band, and wherein sensing the reflected light comprises sensing reflected light over a narrow band, the narrow band included within the broad band of the modulated incident light.

7. The method of claim 1, wherein modulating the incident light comprises modulating incident light over a broad band, and wherein sensing the reflected light comprises sensing reflected light over a narrow band, the narrow band not included within the broad band of the modulated incident light.

8. The method of claim 1, wherein modulating the incident light comprises modulating incident light over a first narrow band, and wherein sensing the reflected light comprises sensing reflected light over a second narrow band, the second narrow band different from the first narrow band.

9. The method of claim 1, wherein modulating the incident light comprises modulating incident light of a first wavelength, and wherein sensing the reflected light comprises sensing reflected light of a second wavelength, the second wavelength different from the first wavelength.

10. The method of claim 1, wherein modulating the incident light comprises modulating incident light of a first wavelength, and wherein sensing the reflected light comprises sensing reflected light of a second wavelength, the second wavelength substantially the same as the first wavelength.

11. The method of claim 1, wherein modulating the incident light comprises modulating incident light over a first narrow band, and wherein sensing the reflected light comprises sensing reflected light over a second narrow band, the second narrow band substantially the same as the first narrow band.

12. The method of claim 1, wherein modulating the incident light comprises modulating incident light over a first broad band, and wherein sensing the reflected light comprises sensing reflected light over a second broad band, the second broad band substantially the same as the first broad band.

13. The method of claim 1, wherein modulating the incident light comprises modulating incident light over a broad band excluding a stop band within the broad band, and wherein sensing the reflected light comprises sensing reflected light within the stop band, and wherein the reflected light is unmodulated prior to reflecting from the resonator.

14. The method of claim 1, wherein a measurement of the reflected light at a first modulation frequency is compared to a measurement of the reflected light at a second modulation frequency to determine the resonant frequency of the resonator, the first modulation frequency at or near a resonant frequency of the resonator and the second modulation frequency away from the resonant frequency of the resonator.

15. The method of claim 1, wherein the modulated incident light is scanned through a predetermined range of frequencies including at least one resonant frequency of the resonator, and wherein the at least one resonant frequency of the resonator is determined by numerically fitting the sensed reflected light from the resonator.

16. The method of claim 1, wherein the incident light is modulated at or near a previously determined resonant frequency of the resonator to track the resonant frequency of the resonator.

17. The method of claim 1, wherein a phase of the incident light is compared to a phase of the reflected light to determine the resonant frequency of the resonator.

18. The method of claim 1 further comprising:

modulating the incident light to determine one or more resonant frequencies of one or more resonators mechanically coupled to the optically coupled resonator.

19. The method of claim 1 further comprising:

analyzing the determined resonant frequency to determine a value of an applied stimulus.

20. A system for determining a resonant frequency of an optically coupled resonator, the system comprising:

means for modulating an incident light;

means for striking a photodiode laterally offset beyond a side of a resonator body with the modulated incident light;

means for generating an electric field between the photodiode and the resonator body in response to the modulated incident light;

means for driving the resonator with a driving component of the generated electric field;

means for sensing a reflected light from the resonator; and means for determining the resonant frequency of the resonator based on the reflected light.

21. The system of claim 20 further comprising:

means for modulating the incident light to determine one or more resonant frequencies of one or more resonators mechanically coupled to the optically coupled resonator.

22. The system of claim 20 further comprising:

means for analyzing the determined resonant frequency to determine a value of an applied stimulus.

23. A method of sensing an applied stimulus, the method comprising:

driving an optically coupled resonator having a photodiode laterally offset beyond a side of a resonator body with an incident light;

sensing one or more resonant frequencies of the resonator with a reflected light from the resonator; and determining the applied stimulus based on the sensed resonant frequency.

* * * * *